(12) United States Patent
Ruiz-Velasco et al.

(10) Patent No.: US 8,949,909 B2
(45) Date of Patent: Feb. 3, 2015

(54) RESOLUTION OF TUNER CONFLICTS

(75) Inventors: Enrique Ruiz-Velasco, Flower Mound, TX (US); Japan A. Mehta, Coppell, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 13/594,024

(22) Filed: Aug. 24, 2012

(65) Prior Publication Data

US 2014/0059585 A1 Feb. 27, 2014

(51) Int. Cl.
*H04N 7/18* (2006.01)

(52) U.S. Cl.
USPC .............................................. 725/78; 725/85

(58) Field of Classification Search
USPC ................. 725/37, 38, 46, 74, 78, 80, 82, 85; 386/292, 293
See application file for complete search history.

(56) References Cited

U.S. PATENT DOCUMENTS

| | | | |
|---|---|---|---|
| 2008/0034391 A1* | 2/2008 | Lehman et al. | 725/59 |
| 2008/0127277 A1* | 5/2008 | Kuschak | 725/74 |
| 2008/0244660 A1* | 10/2008 | Wodka et al. | 725/58 |
| 2011/0078744 A1* | 3/2011 | Adimatyam et al. | 725/58 |
| 2011/0162020 A1* | 6/2011 | Kahn et al. | 725/82 |
| 2011/0225609 A1* | 9/2011 | Li et al. | 725/38 |
| 2012/0284749 A1* | 11/2012 | Lee et al. | 725/39 |

* cited by examiner

*Primary Examiner* — John Schnurr

(57) ABSTRACT

Method, device, and storage medium to identify that a resource conflict exists pertaining to tuners of a device that tune to programs; notify a user that the resource conflict exists; receive a request to release a tuner; release the tuner in response to the request; determine whether a program offer is to be made; and provide the program offer in response to determining that the program offer is to be made.

21 Claims, 7 Drawing Sheets

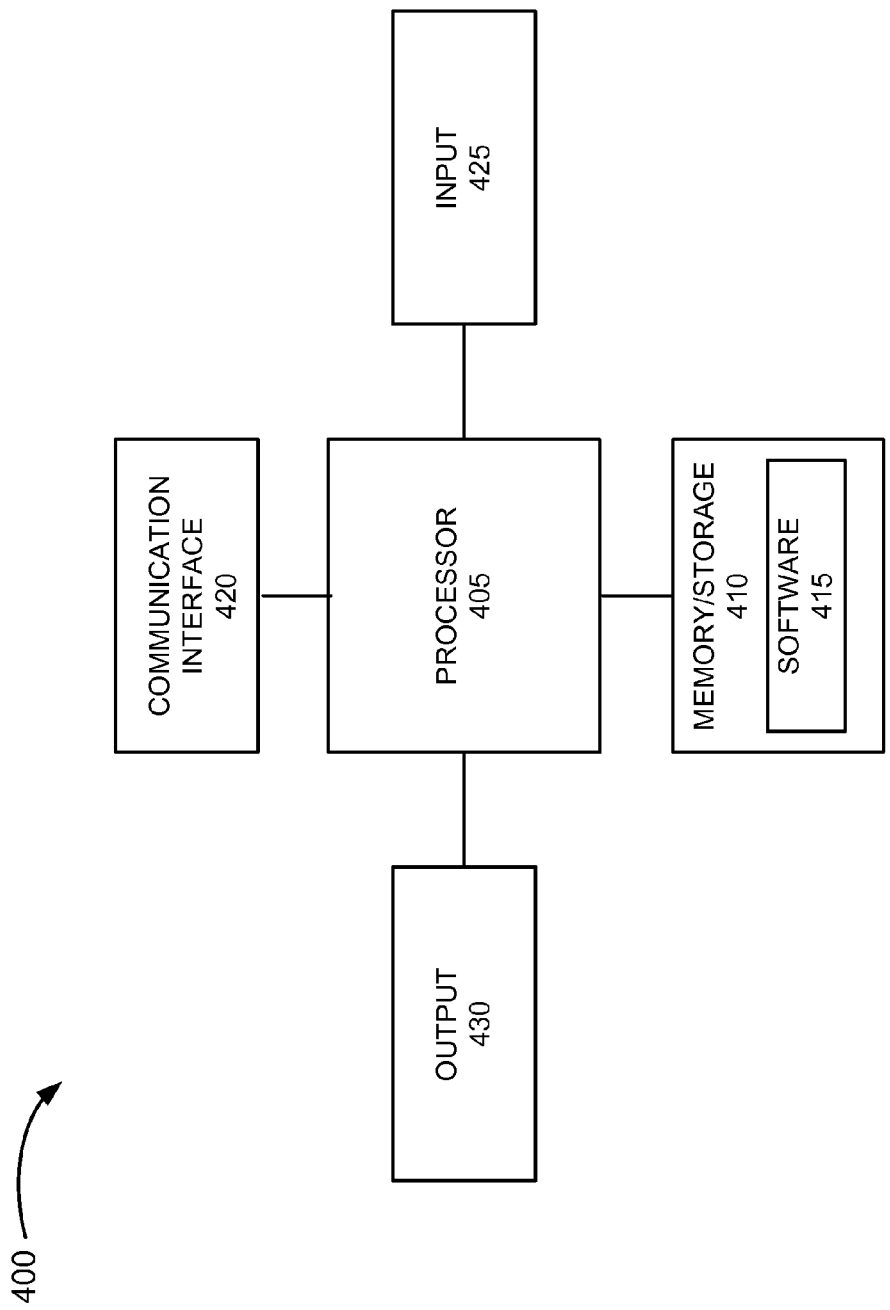

RESOLUTION OF TUNER CONFLICTS

BACKGROUND

Program service providers, such as television service providers, offer users an array of programs to view and record. Typically, program service providers provide users with a program guide interface that indicates what program is being aired on a particular television channel and information about each program. Some television service providers allow users to view a program and record another program simultaneously.

DESCRIPTION OF THE DRAWINGS

FIG. 4 is a diagram illustrating exemplary components of a device that may correspond to one or more of the devices previously depicted.

DETAILED DESCRIPTION

Figure 1:
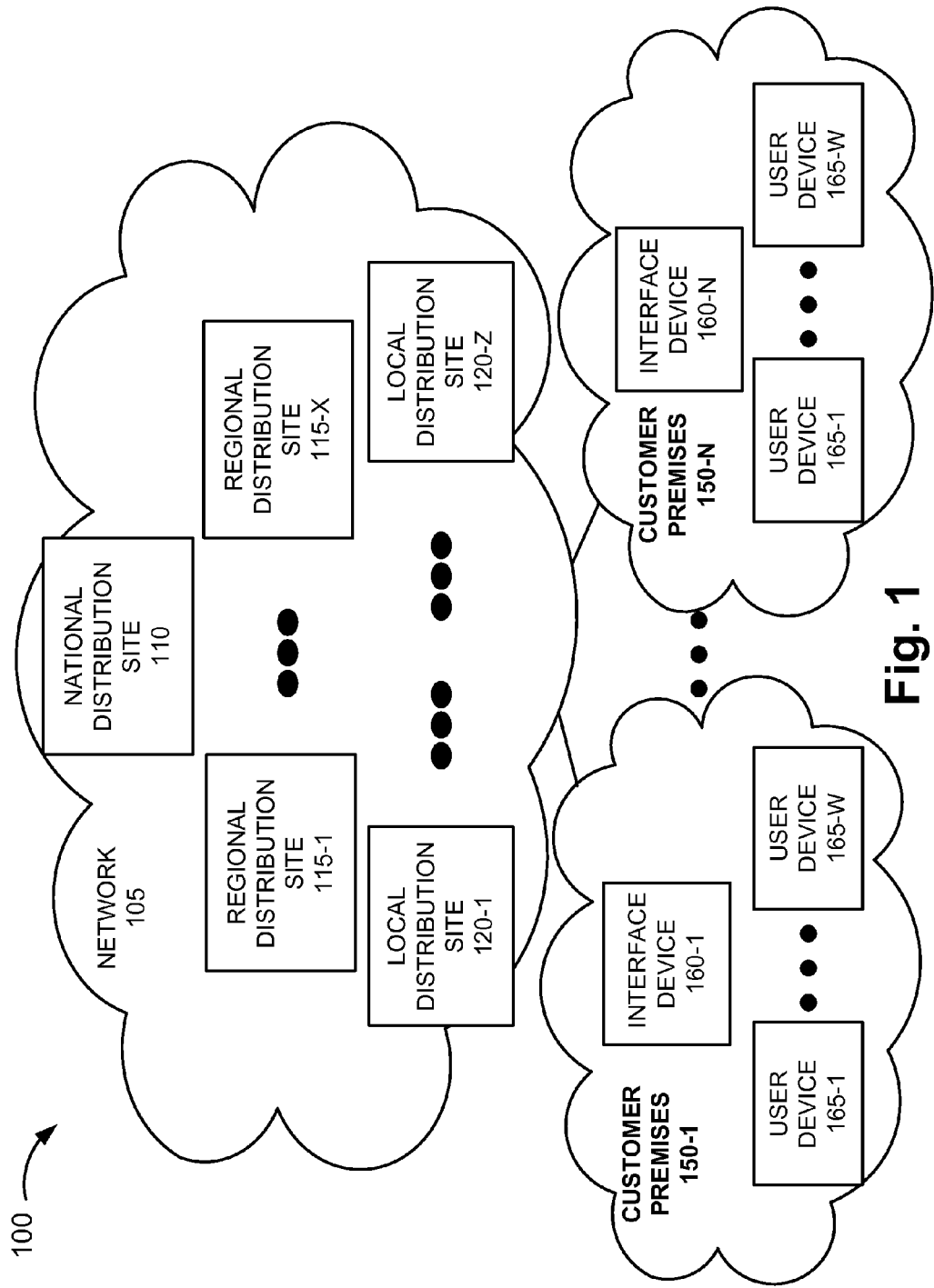
FIG. 1 is a diagram illustrating an exemplary environment in which an exemplary embodiment of tuner conflict resolution may be implemented.

The following detailed description refers to the accompanying drawings. The same reference numbers in different drawings may identify the same or similar elements.

The term "program" includes video and/or audio content, multimedia content, or other types of digital content. For example, a program includes a program of a television channel, such as a local program, a national program, a television show, a movie, a sporting event, a news program, a musical event, a shopping program, a pay-per-view program, a video-on-demand program, or an audio program (e.g., a program that plays music, a music channel that is of a particular musical genre, etc.). Additionally, for example, a program may include content from the Internet.

According to an exemplary embodiment, a program delivery system invokes tuner conflict resolution when there are insufficient resources to accommodate user demand. According to an exemplary embodiment, the program delivery system includes an in-home media device that receives programs from a network and distributes programs to user devices. The in-home media device identifies when there are insufficient resources to accommodate user demand. For example, the in-home media device determines when the number of tuners needed to tune to channels (e.g., modulated channels, such as Quadrature Amplitude Modulation (QAM) channels, or other type of channels) that the users wish to view and record is insufficient.

According to an exemplary embodiment, the in-home media device identifies the tuner conflict in an anticipatory manner. For example, assume that the in-home media device includes six tuners. Assume that four users are each viewing a different program on separate user devices. According to such an example, the in-home media device is using four tuners. Also, assume that there are two programs being recorded. According to such an example, the in-home media device is using all of the six tuners, including the two tuners for recording the two programs. Assume that a third recording is scheduled in the near future. The in-home media device anticipates a tuner conflict.

According to an exemplary embodiment, the in-home media device notifies a user of the conflict or deficiency and provides the user with options to resolve the conflict or automatically resolves the conflict. According to an exemplary embodiment, the in-home media device provides a user interface that requests from one or multiple users to release a tuner.

Depending on whether a user accepts to release a tuner, and as a result, release a program, a user may or may not have a tuner to view a desired program. For example, referring back to the scenario pertaining to an anticipated tuner conflict. Assume that a user that is viewing a program and has another program currently recording, accepts to release a tuner pertaining to the program the user is currently viewing. According to this example, also assume that the user does not wish to view the program currently being recorded. For example, the program being recorded may be half-over. Based on these circumstances, the user does not have a tuner to view a desired program. The in-home media device provides a user interface to determine whether the user wishes to view a program. The user communicates, via the user interface, that the user wishes to view a program. The in-home media device enables the user to still view a program, as described herein.

According to an exemplary embodiment, the in-home media device allows the user to view a program being viewed by another user. According to an exemplary implementation, the in-home media device selects the program based on a matching of a characteristic of the program being released and the programs available from the tuners. For example, the characteristic may be the genre of the program (e.g., drama, comedy, sports, etc.), the rating of the program (e.g., PG, R, etc.), or some other characteristic (e.g., actor, plot, etc.). According to an exemplary implementation, the in-home media device uses electronic programming guide (EPG) information and program information (e.g., metadata associated with each program) to match the characteristic of the program being released with other candidate programs.

According to an exemplary embodiment, the in-home media device selects a program, which matches the characteristic, from sources other than the programs available from the tuners. According to an exemplary implementation, the in-home media device selects (e.g., automatically) a program that can be delivered as an Internet Protocol (IP) channel and does not use a tuner. According to another exemplary implementation, the user selects a program that can be delivered by an IP channel.

According to an exemplary embodiment, the in-home media device provides a user interface that indicates the programs that are using the tuners. According to an exemplary implementation, the user may select the program to be released, which may not be the program the user is viewing, recording, or about to record, but a program that another user is viewing, recording, or about to record.

According to an exemplary embodiment, the in-home media device identifies the tuner conflict in a non-anticipatory manner or current-usage basis. For example, assume that the in-home media device is using all of its tuners. By way of further example, assume that three users are each viewing different programs and recording different programs. Subsequently, a fourth user wishes to view a program. The in-home media device identifies the tuner conflict. The in-home media device provides options to the user to view a program, as described herein.

While exemplary embodiments provided in this description may be implemented based on the use of a particular network architecture, platform, type of program channel, number of tuners, etc., such implementations are not intended to be restrictive or provide an exhaustive treatment, as such. In other words, the embodiments described herein may be implemented using other suitable network architectures, platforms, types of channels, number of tuners, etc., which may not be specifically described.

FIG. 1 is a diagram illustrating an exemplary environment in which an exemplary embodiment of tuner conflict resolution may be implemented. As illustrated in FIG. 1, environment 100 includes network 105 and customer premises 150-1 through 150-N (also referred to collectively and individually as customer premises 150). Network 105 includes a national distribution site 110, regional distribution sites 115-1 through 115-X, in which X>1 (also referred to collectively as regional distribution sites 115 or individually as regional distribution site 115), local distribution sites 120-1 through 120-Z, in which Z>1 (also referred to collectively as local distribution sites 120 or individually as local distribution site 120), and a program resolver 125. Customer premises 150 include interface devices 160-1 through 160-N, in which N>1 (also referred to collectively as interface devices 160 or interface device 160) and user devices 165-1 through 165-W, in which W>1 (also referred to collectively as user devices 165 or individually as user device 165).

The number of devices and the configuration in environment 100 are exemplary and provided for simplicity. According to other embodiments, environment 100 may include additional devices, fewer devices, different devices, and/or differently arranged devices, than those illustrated in FIG. 1. According to other embodiments, a single device in FIG. 1 may be implemented as multiple devices. Additionally, or alternatively, according to other embodiments, multiple devices may be implemented as a single device. Additionally, or alternatively, environment 100 may include additional networks and/or differently arranged networks than those illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and involve intermediary device(s) and/or network(s) not illustrated in FIG. 1.

Network 105 includes one or multiple networks that distributes or makes available programs. Network 105 may be implemented as a satellite-based network and/or a terrestrial-based network. According to an exemplary embodiment, network 105 may be implemented as a television distribution network.

National distribution site 110 includes devices to distribute programs to a national area. Regional distribution site 115 includes devices to distribute programs to a regional area. Local distribution site 120 includes devices to distribute programs to a local area. For example, national distribution site 110 may be implemented as a super headend, regional distribution site 115 may be implemented as a video hub office, and/or local distribution site 120 may be implemented as a video switching office. National distribution site 110, regional distribution site 115, and/or local distribution site 120 may include various devices, such as, for example, media servers, search servers, load balancers, databases, and transport devices (e.g., routers, switches, etc.). Alternatively, national distribution site 110, regional distribution site 115, and/or local distribution site 120 may be implemented as other types of infrastructures (e.g., satellite distribution, stand-alone, etc.), which may or may not include national, regional, and/or local sites that provide, for example, program acquisition (e.g., a content center), program processing, and program distribution.

Each customer premises 150 corresponds to a location where a customer receives service from network 105. For example, the customer may receive service at home, at work, or at another location.

Interface device 160 includes a device that communicates with network 105 to receive programs. For example, interface device 160 may be implemented as a media server device or a set top box controller device. Interface device 160 includes tuners to receive programs. For example, interface device 160 receives channels (e.g., QAM channels, other type of modulated and/or encoded channels, etc.) and tunes to programs using the tuners. Interface device 160 provides the programs to user devices 165. According to an exemplary implementation, interface device 160 is capable of recording programs for users.

User device 165 includes a device that communicates with interface device 160 and/or consumes programs. For example, user device 165 may be implemented as a set top box (e.g., a client device, a thin client device, a converter box, a program receiver device, a peer device, a tuner device, and/or a digibox), a mobile device (e.g., a smartphone, a tablet device, a personal digital assistant (PDA), a personal communication system (PCS), etc.), a television (e.g., a smart television that includes an application/soft client; a non-smart television, etc.), a remote control device, a computer (e.g., a desktop computer, a laptop computer, a palmtop computer, a netbook, etc.), a game system (e.g., a PS3® device, etc.), or other types of user devices capable of receiving programs. Customer premises 150 may include, for example, other types of user devices 165, such as wireless routers and/or other types of communicative devices.

Figure 2A:
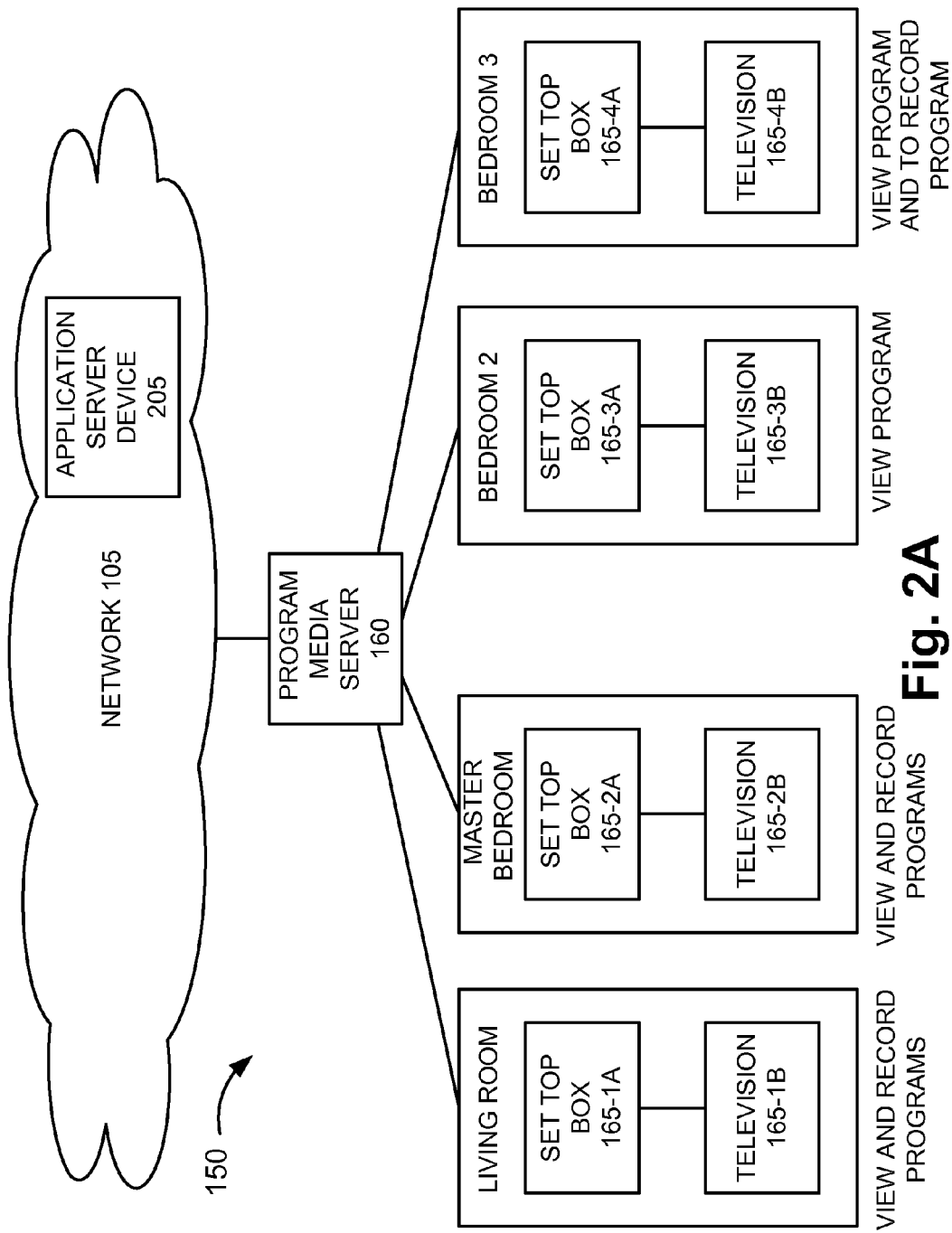
FIGS. 2A and 2B are diagrams illustrating exemplary environments in which exemplary scenarios pertaining to tuner conflict resolution are described.

FIG. 2A is a diagram illustrating an exemplary environment in which an exemplary scenario pertaining to tuner conflict resolution is described. As illustrated, according to an exemplary embodiment, network 105 includes an application server device 205. Although not illustrated, assume that network 105 also includes national distribution site 110, regional distribution sites 115, and local distribution sites 120, as previously described.

Application server device 205 performs tuner conflict resolution processes, as described herein. Application server device 205 may be implemented as a computer or other suitable network device. Application server device 205 may reside outside of national distribution site 110, regional distribution sites 115, and local distribution sites 120, or may be implemented as a network device within one or more of the distribution sites. Alternatively, application server device 205 may not be a part of network 105. For example, application server device 205 may be an Internet-connected server and/or platform.

As further illustrated, at a customer premises 150, interface device 160 (e.g., program media server 160) is connected to user devices 165 (e.g., set top boxes 165-1A through 165-4A and televisions 165-1B through 165-4B) located in various rooms of a home (e.g., living room, master bedroom, bedroom 2, and bedroom 3). Although set top boxes 165 and televisions 165 are depicted as separate devices, set top box 165 and television 165 may be combined into a single device. By way of example, television 165 may be implemented as a smart television that includes a client application corresponding to a set top box or other entity in communication with program media server 160. Alternatively, user devices 165 may be implemented by some other device capable of receiving programs.

According to an exemplary scenario, assume that four users, located in the living room, master bedroom, bedroom 2, and bedroom 3 are watching programs and two other programs are being recorded on other channels for the users located in the living room and the master bedroom. Also assume that program media server 160 has six tuners. Thus, all of the tuners are being used. Assume that a seventh program is scheduled to be recorded and requires a tuner to perform the recording. For example, the user of bedroom 3 wishes to record a program (i.e., the seventh program). Based on the current usage of the tuners and the seventh program scheduled to be recorded, program media server 160 anticipates a tuner conflict and determines that there are no further tuners available to satisfy user demand (e.g., to record the seventh program if the current usage remains the same).

According to an exemplary implementation, program media server 160 identifies the tuner conflict based on a user-configured or service provider-configured pre-notification time period. For example, program media server 160 identifies that a tuner conflict exists at a time prior to (e.g., five minutes prior, ten minutes prior, etc.) a time that the seventh program is to start and is to be recorded.

In response to the anticipated tuner conflict, program media server 160 provides a user interface to one or multiple users. The user interface includes information indicating that a tuner conflict exists and prompts a user whether the user would like to release a tuner. Program media server 160 may provide a user interface, for example, to each user serially (e.g., one at a time), provide the user interface to all users (e.g., in a broadcast fashion), or use some other suitable method. In either case, program media server 160 identifies active users. According to an exemplary implementation, program media server 160 identifies which set top boxes 165 are receiving programs. Based on this information, program media server 160 identifies the active users. According to this exemplary scenario, since there is a user viewing a program in each of the living room, the master bedroom, bedroom 2, and bedroom 3, program media server 160 determines that each set top box 165 is receiving a program and is associated with an active user.

According to an exemplary embodiment, program media server 160 stores information pertaining to how the tuners are being used. For example, program media server 160 may store tuner usage information indicating that tuner 1 is being used for a program being viewed by the user of set top box 165-1A and tuner 2 is being used for recording a program for the user of set top box 165-1A. The user interface that requests whether the user would like to release a tuner may include the tuner usage information. For example, the user interface may request whether the user would like to release a tuner. If the user indicates acceptance, then the user interface includes information pertaining to the tuner(s) associated with the user. For example, the user interface includes information, such as, a tuner number, the name of the program, length of program (e.g., 8:00 p.m. -9:00 p.m.), and type of tuner usage (e.g., being viewed, being recorded). The user may select the tuner to release. Program media server 160 generates the appropriate user interface to provide a user based on the tuner usage information. Depending on the circumstances, the user may select from multiple tuners to release, if for example, the user is viewing a program and recording a program.

According to other implementations, the user interface may include information pertaining to the usage of all of the tuners. In this way, a user may release a tuner that is being used by another user. By way of example, a parent or an account holder may be allowed to release a tuner being used by a child, other member of the household, etc. According to an exemplary implementation, program media server 160 uses user profile information to provide such an interface to the parent or the account holder. The user profile information may include, for example, room-to-user mappings or set top box identifier to user mappings, and information identifying users (e.g., parent, account holder, daughter, etc.). The user profile information may be stored by program media server 160 or by a network device in network 105.

The user interface may indicate other information, such as, the user needing a release of the tuner (e.g., the user associated with the recording of the seventh program). In response to displaying the user interface, a user can indicate to release a tuner/program or not.

According to this exemplary scenario, assume that the user of set top box 165-1 indicates to release a tuner. According to an exemplary implementation, program media server 160 stores release data. For example, program media server 160 stores release data that indicates the users involved in the tuner release (e.g., the user for which the tuner release request is initiated, the user accepting the release), date, time, program released, etc. The release data may be used by users to negotiate the release of a tuner (e.g., as an "I owe you") from another user in the future. For example, program media server 160 can provide the release data to a user seeking the release of a tuner. The user may chose to select a user owing a release when deciding to whom program media server 160 sends a tuner release request. The tuner release request includes the release data so that the receiving user understands that the requesting user previously granted a release. According to another implementation, program media server 160 automatically selects an order for sending a tuner release request based on the release data.

According to this exemplary scenario, assume that the user of set top box 165-1A selects to release the tuner associated with the program being viewed rather than the program being recorded. According to an exemplary implementation, program media server 160 notifies the user in bedroom 3 that a tuner release request was sent and that the user in the living room released a tuner. According to an exemplary implementation, program media server 160 notifies a user that has yet to respond to the tuner release request that the tuner conflict has been resolved.

In response to the release of the tuner, program media server 160 determines whether a program offer is to be made. For example, program media server 160 determines whether it is appropriate to provide a user interface to obtain the user's wishes regarding the viewing of a program. For example, the user may turn off user device 165 (e.g., set top box 165) to indicate that the user does not wish to view a program. According to such an example, program media server 160 determines that a program offer does not have to be made. For example, program media server 160 determines that a program offer does not have to be made to the user located in the living room. According to another exemplary scenario, the program being viewed by the user in the living room may end at the time the seventh program begins and is to be recorded. Thus, the possibility exists that the user may wish to continue to view another program. Also, the possibility exists that the user may wish to stop viewing a program after the program ends.

According to an exemplary embodiment, program media server 160 uses EPG information associated with the program being released to determine whether a program offer is to be made. For example, according to this example, program media server 160 uses EPG information pertaining to the program being viewed by the user in the living room. In the event that the program does not end when the seventh program begins, according to an exemplary implementation, program media server 160 automatically assumes that the user wishes to continue to view the program and determines that a program offer is to be made. Alternatively, according to an exemplary implementation, if the program does end when the seventh program begins, program media server 160 provides a user interface that queries the user as to whether the user wishes to continue to view a program after this program ends. If the user indicates that the user does not wish to continue to view a program, program media server 160 determines that a program offer is not to be made. If the user indicates that the user wishes to continue to view a program, program media server 160 determines that a program offer is to be made.

In response to determining that a program offer is to be made, according to an exemplary embodiment, program media server 160 identifies the programs being used by each tuner. For example, program media server 160 uses EPG information and program information to identify the programs currently being received by each tuner. Program media server 160 provides a user interface that offers the programs to the user for viewing. The user may accept or reject the programs included in the program offer. For example, the user may view a program being viewed by another user or a program being recorded. In the event that another user is recording or viewing a same program that the user released, program media server 160 automatically provides the program to the user.

According to an exemplary scenario, assume that the program released by the user in the living room, which the user was viewing, does not end when the seventh program begins. Also assume that the same program is not being viewed or recorded by another user. According to exemplary embodiments, program media server 160 provides one or more of the following program viewing options.

According to an exemplary embodiment, program media server 160 determines whether the program or a similar program is available via an IP channel, which does not require the use of a tuner. For example, Internet/Web sites, such as You-Tube®, HBO GO®, Hulu® and/or other program sites may include the program the user wishes to view or a similar program. For example, a similar program may be based on one or more characteristics of the program (e.g., rating, actor, genre, plot, title, etc.). Additionally, a similar program may include the same program of a program series, but a different episode.

According to an exemplary implementation, program media server 160 provides a user interface to allow the user to select a program site. In this way, the user may select a program site to which the user is subscribed (e.g., HBO GO® requires a subscription to HBO®, Netflix®, etc.) or the user may select a free program site (e.g., You Tube®, etc.). In response to the user selection of a program site, program media server 160 generates and transmits a program request to network 105. For example, program media server 160 transmits the program request to application server device 205. Application server device 205 searches for the program or similar program based on the program request. According to an exemplary implementation, the program request includes a program identifier that indicates the program that the user was viewing. The program request may include metadata pertaining to the program. For example, program media server 160 may obtain the metadata from the EPG information or program information. Applicant server device 205 may use the EPG information or the program information to search for the same program or similar programs when the program is not available. Alternatively, application server device 205 obtains EPG or program information from a device in network 105 (e.g., a device included in local distribution site 120, etc.).

According to another exemplary implementation, program media server 160 initiates a search for the program or similar program without providing the user interface to select the program site.

According to another exemplary embodiment, program media server 160 performs a search of the selected program site. Alternatively, according to an exemplary implementation, program media server 160 provides a user interface to allow the user to select/search for a program on the selected program site.

According to these implementations and embodiments described (e.g., program media server 160 search, user search via the user interface, application server device 205 search, etc.), the user is provided with the search results. The user may then select, via a user interface, a program included in the search results to view. Program media server 160 provides the selected program to the user located in the living.

According to another exemplary scenario, assume that the program released by the user in the living room, which the user was viewing, ends when the seventh program begins. Also assume, program media server 160 provides a user interface that queries the user as to whether the user wishes to continue to view a program, after this program ends. The user indicates that the user wishes to view a program.

According to an exemplary embodiment, program media server 160 provides a user interface that prompts the user to select the program the user wishes to watch via the EPG. If the program is being viewed or recorded by one of the six tuners, then program media server 160 provides the program to the user. If the program is not being viewed or recorded by one of the six tuners, program media server 160 may perform one or more of the following processes previously described. For example, program media server 160 attempts to provide the selected program or a similar program via an IP channel.

According to an exemplary embodiment, program media server 160 stores tuning information pertaining to programs viewed by a user. According to exemplary embodiment, program media server 160 includes a recommendation engine that uses the tuning information to recommend a program. As described herein, program media server 160 provides viewing options to users when all of the tuners are being used. According to such embodiment, program media server 160 uses tuning information to select a program for the user to view. For example, program media server 160 analyzes the tuning information and attempts to locate a program that the user has previously viewed. For example, if the user likes watching a particular television series, program media server 160 attempts to find the television series on the Internet. Program media server 160 provides a user interface that includes episodes that are available for viewing. Alternatively, in response to analyzing the tuning information, program media server 160 provides a listing of programs, via a user interface, to the user. The user may select a program for program media server 160 to retrieve. For example, the user may select a particular episode of the television series or the name of the television series. Program media server 160 provides a user interface to the user to allow the user to select one of the recommended programs.

According to an exemplary embodiment, program media server 160 provides parental control. For example, assume the user in the bedroom 2 selects a program that is rated PG-13. Assume that the user in the bedroom 2 is eight years old. Program media server 160 identifies that the user is eight years old based on user profile information. The user profile information may include, for example, the age of the user (e.g., eight years old), relationship to the account holder (e.g., daughter, etc.), and other types of information (e.g., set top box identifier for set top box 165-3A, bedroom 2, user name). According to this exemplary scenario, program media server 160 blocks the viewing of the program. Alternatively, program media server 160 causes an interactive overlay to be displayed on television 165-2B via set top box 165-2A. The interactive overlay notifies the parents (e.g., located in the master bedroom) that the user (e.g., their eight year old daughter) wishes to view the program rated PG-13. For example, the overlay includes program information (e.g., title of program, plot, rating, actors, year of program, etc.). The parents may accept or deny the viewing of the program on behalf of their daughter via the interactive overlay.

Figure 2B:
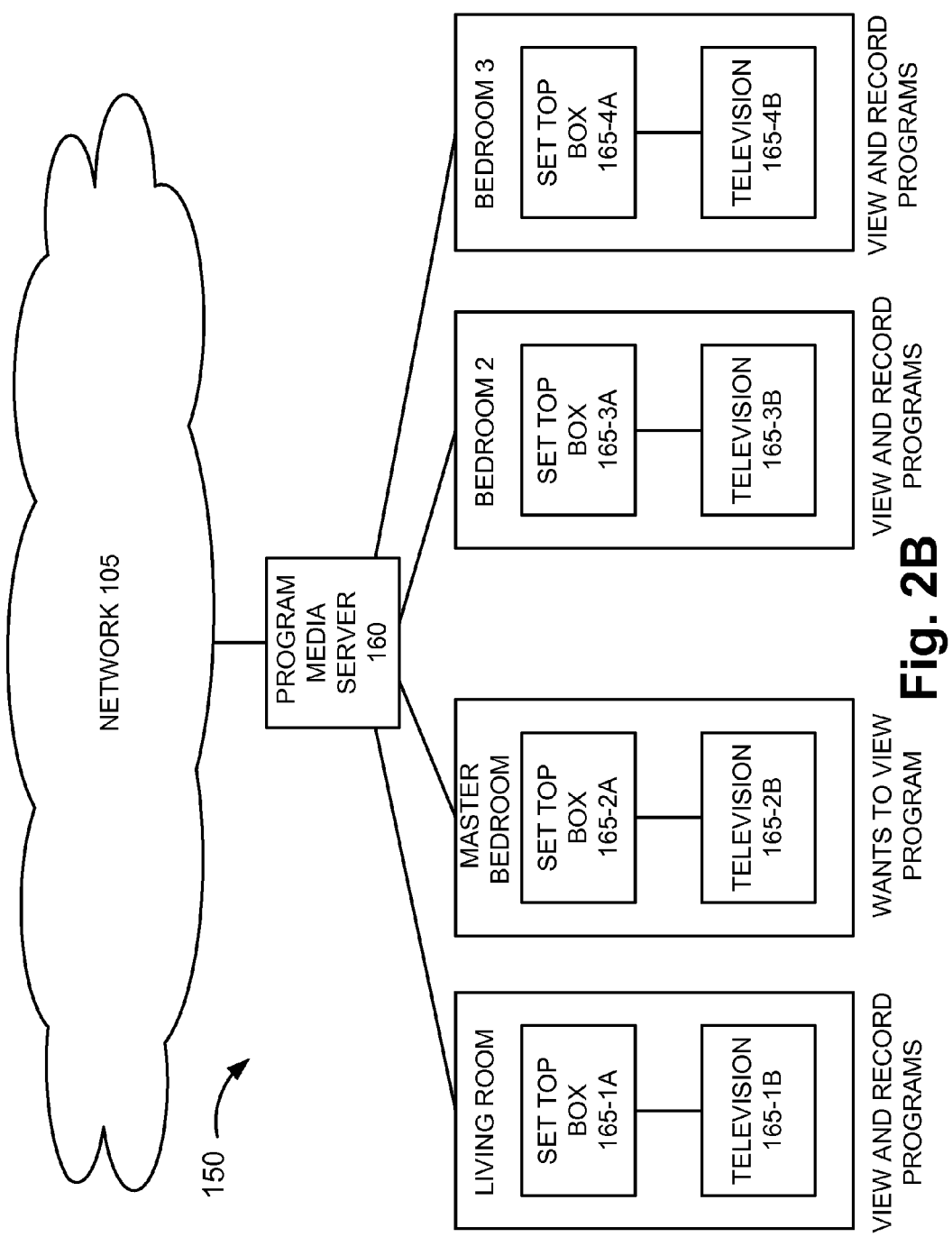

FIG. 2B is a diagram illustrating an exemplary environment in which an exemplary scenario of tuner conflict resolution is described. Assume that three users, located in the living room, bedroom 2, and bedroom 3, are viewing programs and have designated three other programs that are recording on other channels. Also assume that program media server 160 has six tuners. Thus, all of the tuners are being used. Program media server 160 identifies that there are no further tuners available. Subsequently, a fourth user located in the master bedroom decides to watch television 165-2B. Upon turning on television 165-2B, the user is presented with a user interface that indicates that all of the tuners are being used.

According to this exemplary scenario, program media server 160 is not anticipating a tuner conflict. Rather, the tuner conflict currently exists. Similar to that previously described, program media server 160 sends tuner release requests to the active users. In the event that a tuner release occurs, the user in the master bedroom may view or record a program. However, if the other users do not wish to release a program, program media server 160 provides various program offer options to the user, as previously described.

According to an exemplary embodiment, program media server 160 identifies the programs being recorded and searches the EPG to determine whether the program is re-airing at a later time. If the program is re-airing, program media server 160 provides this information to the user. For example, assume the user in bedroom 2 is recording a program that re-airs tomorrow. Program media server 160 may provides this information to the user in the tuner release request or after a negative response to the tuner release request is received. The user in bedroom 2 may indicate, via a user interface, to release the tuner or not based on this information. Alternatively, program media server 160 may inform users (e.g., in the tuner release request) that are recording programs that a tuner conflict exists and whether they would like program media server 160 to search the EPG to see if the program is re-airing at a later time. If a user accepts the search request, program media server 160 searches the EPG to determine whether the program re-airs. If program media server 160 determines that the program re-airs, program media server 160 provides this information to the user. For example, a search result includes the date and time the program re-airs. The user may accept or deny the re-scheduling and tuner release. According to an exemplary embodiment, program media server 160 may perform a similar search for programs that the other users are viewing to determine whether the program is re-airing.

According to an exemplary embodiment, if the other users do not wish to release a program, the user may select a program from the EPG and program media server 160 will try to provide the selected program or a similar program to the user. Alternatively, program media server 160 may recommend a program based on tuner information, provide the user with a program currently being provided by one of the tuners (e.g., a program being recorded, a program being viewed by another user), allow the user to select a program site, etc., as previously described. Alternatively, program media server 160 provides a user interface to allow the user to enter a title of a program or search programs that have been recorded, on behalf of the user or other users.

Figure 3:
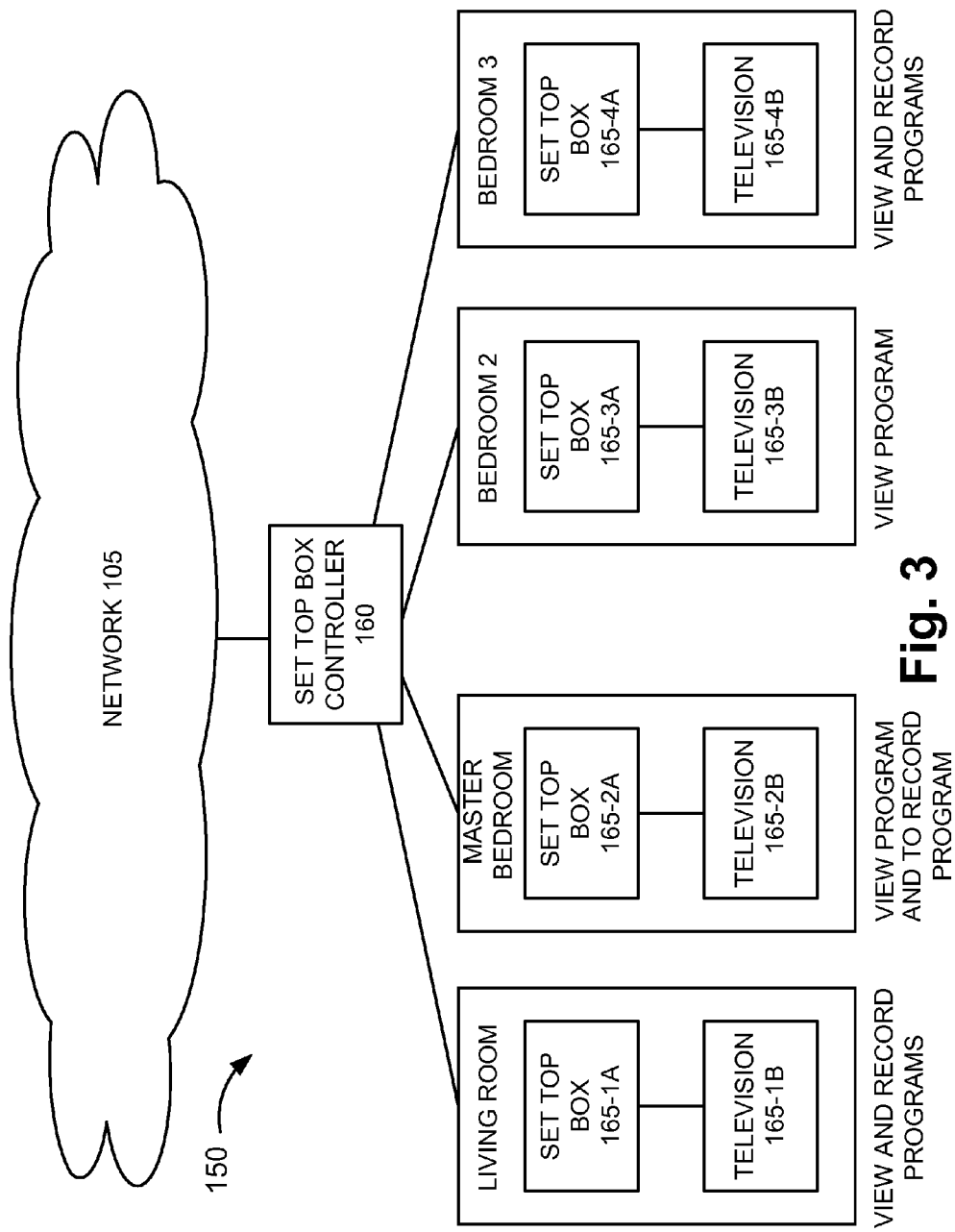
FIG. 3 is a diagram illustrating an exemplary environment in which an exemplary scenario pertaining to tuner conflict resolution is described.

FIG. 3 is a diagram illustrating an exemplary environment in which an exemplary scenario of tuner conflict resolution is described. Assume that four users, located in the living room, master bedroom, bedroom 2, and bedroom 3 are watching programs and two other programs are being recorded on other channels for the users located in the living room and the bedroom 3. Also assume that set top box controller 160 has six tuners. Thus, all of the tuners are being used. Assume that a seventh program is scheduled to be recorded and requires a tuner to perform the recording. For example, the user of the master bedroom wishes to record a program (i.e., the seventh program). Based on the current usage of the tuners and the seventh program scheduled to be recorded, set top box controller 160 anticipates a tuner conflict and determines that there are no further tuners available to satisfy user demand (e.g., to record the seventh program if the current usage remains the same).

In response to the anticipated tuner conflict, set top box controller 160 provides a user interface to one or multiple users that requests release of a tuner. According to this exemplary scenario, assume that the user in the master bedroom decides to release the tuner that provides the program the user is viewing. Set top box controller 160 provides a user interface that lists the programs associated with the six tuners. The user selects a program that is being viewed by the user in the living room. Set top box controller 160 provides the program to both set top box 165-1A and set top box 165-2A.

FIG. 4 is a diagram illustrating exemplary components of a device 400 that corresponds to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, interface device 160 and application server device 205 may be implemented with one or more program(s) and/or application(s). Additionally, for example, with reference to user device 165, one or more program(s) and/or application(s) may be used to display user interfaces, communicate with interface device 160, etc. Additionally, for example, other devices may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

According to an exemplary embodiment, interface device 160 receives programs from a distribution site of network 105 (e.g., local distribution site 120, etc.). Interface device 160 comprises tuners that permit interface device 160 to tune to particular programs (e.g., television channels, etc.) requested by users via user devices 165.

Device 400 may perform processes and/or functions, as described herein, in response to processor 405 executing software 415 stored by memory/storage 410. By way of example, instructions may be read into memory/storage 410 from another memory/storage 410 or read into memory/storage 410 from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.) or the execution of software (e.g., processor 405 executing software 415).

Figure 5A:
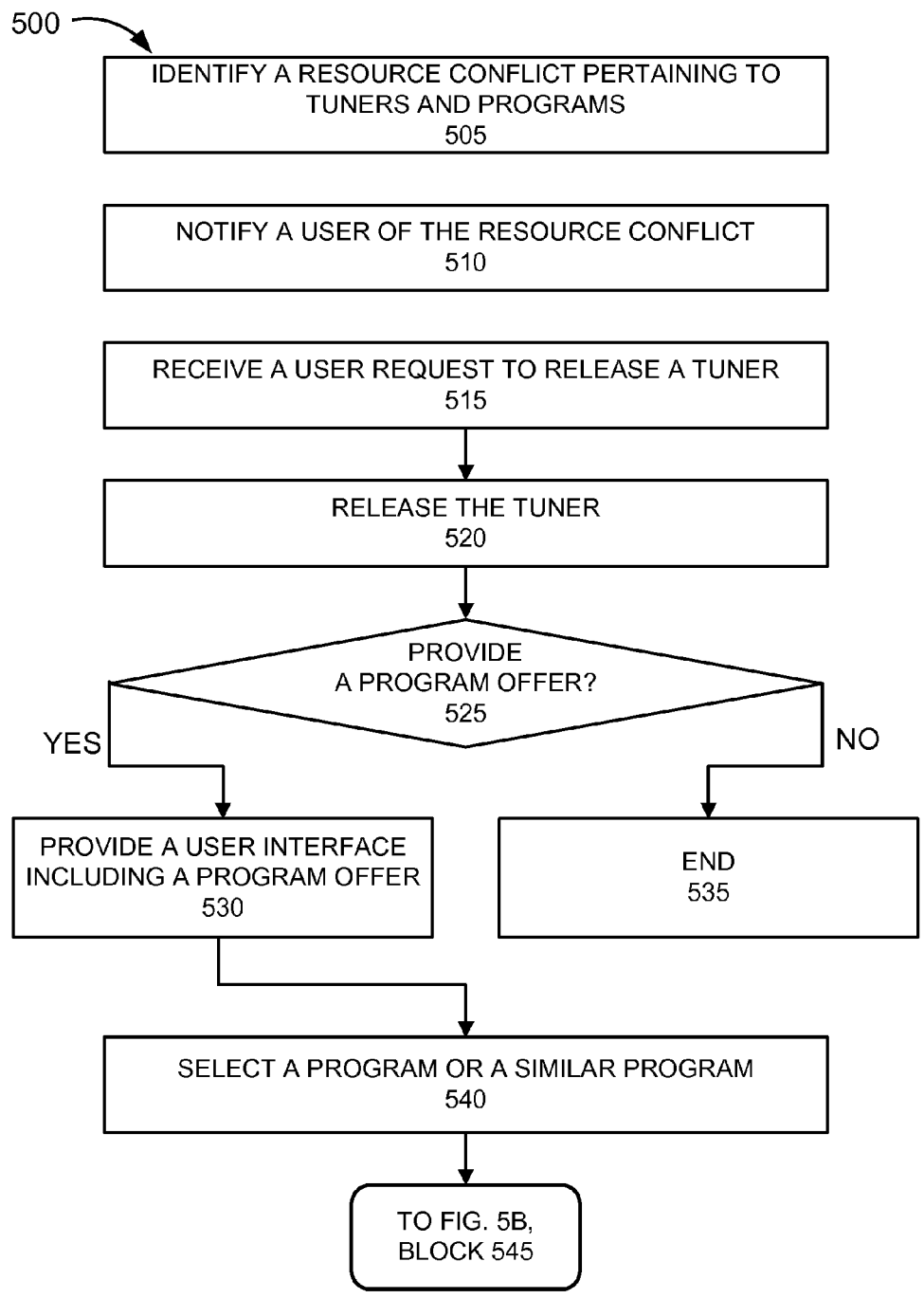
FIGS. 5A and 5B is a flow diagram illustrating an exemplary process pertaining to tuner conflict resolution.
Figure 5B:
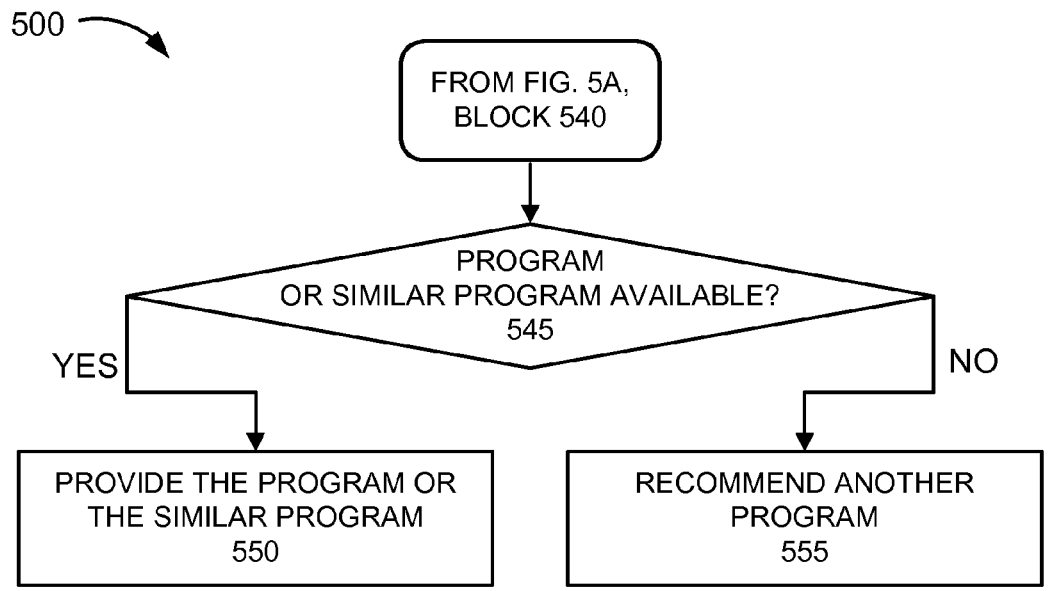

FIGS. 5A and 5B is a flow diagram illustrating an exemplary process 500 pertaining to tuner conflict resolution. A step or an act described in process 500 is performed by one of the devices illustrated in FIG. 1. For example, processor 405 of interface device 160 may execute software 415 to perform the step or the act described.

Referring to FIG. 5A, process 500 begins with identifying a resource conflict pertaining to tuners and programs (block 505). For example, as previously described, interface device 160 identifies that there are an insufficient number of tuners to accommodate user demand. For example, interface device 160 recognizes that the maximum number of tuners is currently being used and a request for use of another tuner is received. For example, interface device 160 may identify that there are an insufficient number of tuners in a predictive manner. For example, interface device 160 stores program recording schedule information to record a program. Interface device 160 predicts that a resource conflict is likely to occur based on the current tuner usage and the program recording schedule information.

In block 510, a user is notified of the resource conflict. For example, as previously described, interface device 160 causes a notification (e.g., a user interface) to be sent to a user in response to identifying the resource conflict. The notification may also allow the user to select a tuner to release. For purposes of description of process 500, it may be assumed that the user selects a tuner to release.

In block 515, a user request to release a tuner is received. For example, as previously described, interface device 160 receives a user request, via the user interface, to release a tuner. The released tuner may be a tuner a user intended to use for viewing a program or recording a program.

In block 520, the tuner is released. For example, as previously described, interface device 160 releases the tuner. Interface device 160 may store release data pertaining to this event. For example, the release data may include the users involved, the date and time, the program released, etc., as previously described.

In block 525, it is determined whether a program offer is to be made. For example, interface device 160 determines whether it is appropriate to provide a user interface to obtain the user's wishes regarding the viewing of a program. For example, a user may turn off user device 165 to indicate that the user does not wish to view a program. According to such an example, interface device 160 determines that a program offer does not have to be made. Also, depending on the tuner released by the user, the user may be able to view a program. For example, the user may be using two tuners and releases a tuner used for recording a program, while keeping a tuner used for viewing a program. According to such an example, interface device 160 determines that a program offer does not have to be made. Conversely, if the user releases a tuner used for viewing a program, interface device 160 may determine that a program offer is to be made.

Interface device 160 analyzes the usage of tuners (e.g., used for recording a program, used for viewing a program, etc.), to determine whether a user that wishes to view a program is unable to view a program. For example, interface device 160 identifies active user devices 165 (e.g., set top box 165, etc.) to infer that a user wishes to view a program and is unable to do so. According to another implementation, user device 165 (e.g., a set top box remote control device) may allow the user to transmit a request (e.g., by pressing a button, etc.), via user device 165 (e.g., set top box 165), to interface device 160 to indicate to interface device 160 that the user is unable to tune to a program. Interface device 160 may perform other steps or acts to determine whether a program offer is to be made, as previously described. For example, interface device 160 may provide a user interface that prompts the user to indicate whether the user would like to continue to view a program.

If it is determined that a program offer is to be made (block 525—YES), then a user interface to the user is provided (block 530). For example, interface device 160 provides a user interface that lists program viewing options. For example, the program viewing options include programs available via the tuners or programs available from another source (e.g., a program site, an IP channel, etc.).

If it is determined that a program offer is not to be made (block 525—NO), then process 500 ends (block 535). For example, interface device 160 determines that the user does not wish to view a program.

In block 540, a program or a similar program is selected. For example, interface device 160 may receive a selection via the program viewing options user interface. According to an exemplary scenario, interface device 160 provides a user interface that lists programs being received by the tuners. The user may select one of the programs to view, which may be a program being viewed by another user or a program being recorded.

According to another scenario, if the user was viewing a program and that particular tuner was released, interface device 160 uses program information pertaining to the program to compare with other programs being viewed or recorded via the tuner. For example, interface device 160 determines whether a characteristic of a program (e.g., genre, title of program, actor, rating, etc.) being received by an available tuner matches the characteristic of the program released. If interface device 160 identifies a program with a matching characteristic, interface device 160 provides the user with a user interface that indicates the program is available for viewing. The user may select the program to view.

According to yet another scenario, as previously described, interface device 160 may receive a selection via the program viewing options interface that the user wishes to receive a program from another source. Interface device 160 selects the program the user was viewing or a similar program and attempts to obtain the program via an Internet/Web site. Interface device 160 provides user interfaces to allow the user to select a program site. Alternatively, interface device 160 may allow the user to select/search for a program, etc., as previously described.

Referring to FIG. 5B, in block 545, it is determined whether the program or the similar program is available. For example, as previously described, interface device 160 or the user may search a program site to obtain a program or similar program. Alternatively, application server device 205 searches the program site. Based on the search results, interface device 160 determines whether the program or the similar program is available.

If it is determined that the program or the similar program is available (block 545-YES), then the program or the similar program is provided (block 550). For example, as previously described, interface device 160 provides the program to the user. The user views the program via an IP channel or other delivery mechanism.

If it is determined that the program or the similar program is not available (block 545-NO), then another program is recommended (block 555). For example, as previously described, interface device 160 uses tuning information to recommend a program. Interface device 160 provides a user interface to the user that indicates the recommended programs. The user may select, via the user interface, a recommended program. Interface device 160 attempts to obtain the program. If interface device 160 is unable to obtain the recommended program, process 500 may return to block 540 or process 500 may end.

Although FIGS. 5A and 5B illustrate an exemplary process 500 to resolve a resource conflict, process 500 may include additional operations, fewer operations, and/or different operations than those illustrated in FIGS. 5A and 5B and described herein. For example, process 500 may resolve the resource conflict in a manner that is different from the steps described in FIGS. 5A and 5B depending on the circumstances, user preferences, requests made by a user, etc. For example, according to other scenarios, in block 505, interface device 160 may determine a current tuner conflict (e.g., as described in relation to FIG. 2B). Additionally, according to other scenarios, blocks 515 and 520 may include steps or acts in which tuner release requests are sent to user(s) and negative responses are received (e.g., a tuner is not released).

The foregoing description of embodiments provides illustration, but is not intended to be exhaustive or to limit the embodiments to the precise form disclosed. Accordingly, modifications to the embodiments described herein may be possible. For example, according to other embodiments, one or more processes or sub-processes (e.g., a step, etc.) may be performed by a device other than interface device 160. For example, user device 165 (e.g., a set top box) may perform one or more of the processes or sub-processes described herein. Alternatively, one or more processes or sub-processes may be performed by application server device 205 or a cloud service associated with network 105.

Also, for example, other modifications to the embodiments described may be implemented. By way of example, according to an exemplary embodiment, interface device 160 stores user preferences pertaining to tuner conflict resolution. For example, a user may store a preference that requires interface device 160 to release a tuner used for recording a program instead of a tuner used by a user for viewing a program. The user preferences may include other types of information pertaining to tuner conflict resolution, such as favorite programs, information that indicates a program site to perform a program search, log-in information to access a program site, time-period constraints for searching for the re-airing of a program (e.g., within 1 day, etc.), etc.

According to an exemplary embodiment, interface device 160 uses user profile information to resolve a tuner conflict. For example, in response to identifying a tuner conflict, interface device 160 determines whether the account holder is an active user. If the account holder is an active user, interface device 160 provides a user interface that includes a listing of the tuner usage. The account holder selects the tuner to release.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.) or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   identifying, by a device, that a resource conflict exists pertaining to tuners that tune to programs;
   notifying, by the device, a user that the resource conflict exists;
   receiving, by the device, a request to release a tuner;
   releasing, by the device, the tuner in response to the request;
   storing tuner release information that includes information pertaining to a user for which the tuner was released, a date and time the tuner was released, and a program associated with the tuner that was released;
   determining, by the device, whether a program offer is to be made in response to the releasing;
   providing, by the device, the program offer in response to determining that the program offer is to be made, wherein the program offer includes at least one program that does not use the tuners; and
   using the tuner release information to select a user for requesting a release of a tuner in response to a subsequent resource conflict.

2. The method of claim 1, wherein the determining comprises:
   analyzing a usage of the tuners and corresponding active users;
   determining whether there is a tuner for each active user to allow each active user to view a program; and
   determining that the program offer is to be made based on determining that there is not a tuner for each active user to allow each active user to view a program, wherein the at least one program includes a same program for which the tuner was released.

3. The method of claim 1, comprising:
   receiving a user acceptance to the program offer;
   selecting a program received by one of the tuners; and
   providing the program received by the one of the tuners to the user or another user.

4. The method of claim 3, wherein the selecting comprises:
   matching a program characteristic of a program previously received by the tuner that was released to a program characteristic of another program.

5. The method of claim 3, further comprising:
   storing user profile information pertaining to users of the device; and
   using the user profile information for selecting the program received by the one of the tuners.

6. The method of claim 1,
   wherein the at least one program is available via an Internet Protocol channel.

7. The method of claim 1, further comprising:
   providing a user interface that allows the user or another user to select one of the programs tuned to by one of the tuners.

8. The method of claim 1, further comprising:
   storing a pre-notification time period that indicates an instance in time before the resource conflict occurs, wherein the notifying comprises:
   notifying the user that the resource conflict exists based on the pre-notification time period; and
   providing a user interface that allows the user to select the tuner to be released.

9. A device comprising:
   tuners capable of tuning to programs;
   a communication interface;
   a memory that stores instructions; and
   a processor to execute the instructions to:
      identify that a resource conflict exists pertaining to the tuners;
      notify, via the communication interface, a user that the resource conflict exists;
      receive, via the communication interface, a request to release a tuner;
      release the tuner in response to the request;
      store tuner release information that includes information pertaining to a user for which the tuner was released, a date and time the tuner was released, and a program associated with the tuner that was released;
      determine whether a program offer is to be made in response to the release of the tuner;
      transmit, via the communication interface and to a user device, the program offer in response to a determination that the program offer is to be made, wherein the program offer includes at least one program that does not use the tuners and the at least one program can be consumed immediately; and
use the tuner release information to select a user for requesting a release of a tuner in response to a subsequent resource conflict.

10. The device of claim 9, wherein the processor is to execute the instructions to:
analyze a usage of the tuners and corresponding active users;
determine whether there is a tuner for each active user to allow each active user to view a program; and
determine that the program offer is to be made based on a determination that there is not a tuner for each active user to allow each active user to view a program, wherein the at least one program includes a same program for which the tuner was released.

11. The device of claim 9, wherein the processor is to execute the instructions to:
receive, via the communication interface, a user acceptance to the program offer;
select a program received by one of the tuners; and
transmit, via the communication interface, the program to the user device.

12. The device of claim 11, wherein the processor is to execute the instructions to:
match a program characteristic of a program previously received by the tuner that was released to a program characteristic of another program.

13. The device of claim 11, wherein the processor is to execute the instructions to:
store user profile information pertaining to users of the device; and
use the user profile information to select the program.

14. The device of claim 9, wherein the at least one program is available via an Internet Protocol channel.

15. The device of claim 9, wherein the processor is to execute the instructions to:
provide, via the communication interface, a user interface that allows the user or another user to select one of the programs tuned by one of the tuners.

16. The device of claim 9, wherein the device comprises a set top box controller or an in-home media server.

17. A non-transitory storage medium storing instructions executable by a device, wherein the instructions comprise instructions to:
identify that a resource conflict exists pertaining to tuners of the device that tune to programs;
notify a user that the resource conflict exists;
receive a request to release a tuner;
release the tuner in response to the request, wherein each of the tuners are used;
store tuner release information that includes information pertaining to a user for which the tuner was released, a date and time the tuner was released, and a program associated with the tuner that was released;
determine whether a program offer is to be made in response to the release of the tuner;
provide the program offer in response to determining that the program offer is to be made, wherein the program offer includes at least one program that does not use the tuners and the at least one program can be consumed immediately; and
use the tuner release information to select a user for requesting a release of a tuner in response to a subsequent resource conflict.

18. The non-transitory storage medium of claim 17, wherein the instructions comprise instructions to:
receive a user acceptance to the program offer;
select a program received by one of the tuners; and
provide the program to the user or another user.

19. The non-transitory storage medium of claim 18, wherein the instructions to select comprise instructions to:
match a program characteristic of a program previously received by the tuner that was released to a program characteristic of another program.

20. The non-transitory storage medium of claim 17, wherein the at least one program is available via an Internet Protocol channel.

21. A method comprising:
identifying, by a device, that a resource conflict exists pertaining to tuners that tune to programs;
notifying, by the device, a user that the resource conflict exists;
receiving, by the device, a request to release a tuner;
releasing, by the device, the tuner in response to the request;
storing tuner release information that includes information pertaining to a user for which the tuner was released, a date and time the tuner was released, and a program associated with the tuner that was released;
determining, by the device, whether a program offer is to be made;
providing, by the device, the program offer in response to determining that the program offer is to be made; and
using the tuner release information to select a user for requesting a release of a tuner in response to a subsequent resource conflict.

* * * * *